March 27, 1962 R. J. MOULY 3,027,457
NON-CONTACTING TUBING GAGE
Filed May 27, 1959 2 Sheets-Sheet 1
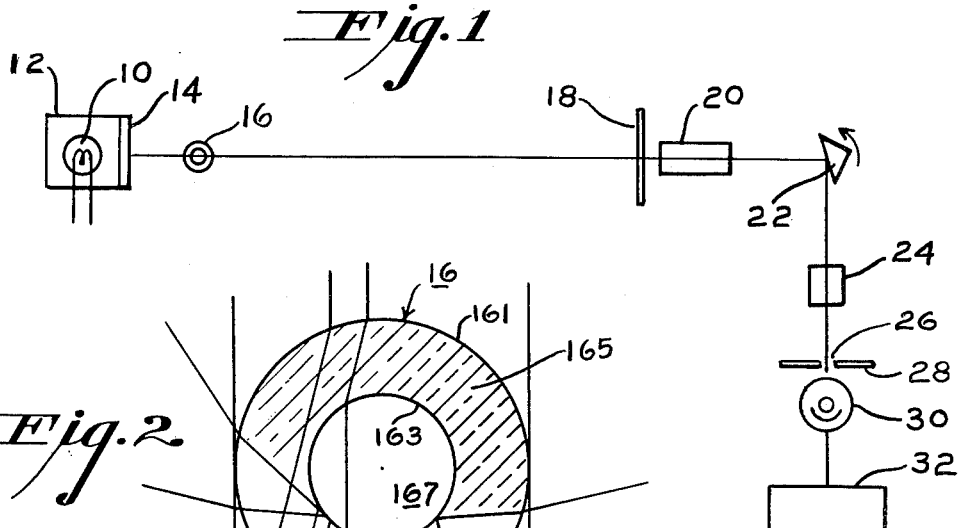
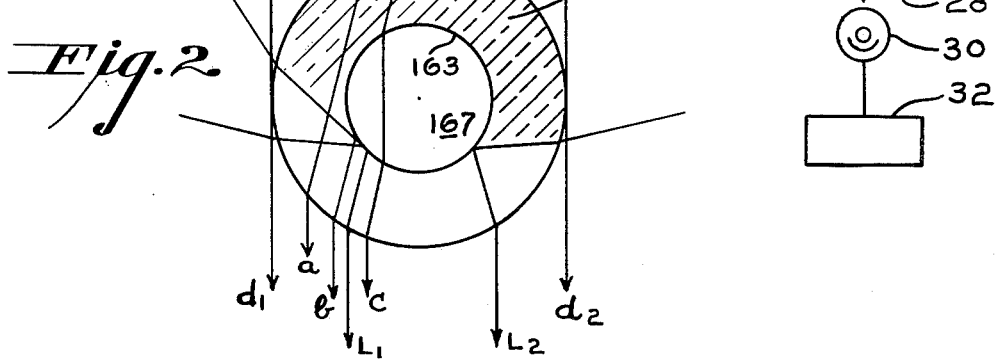
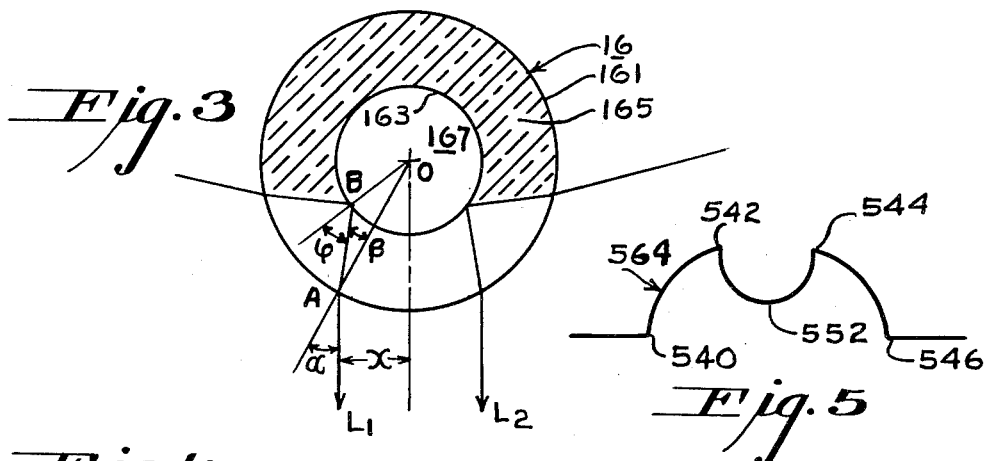
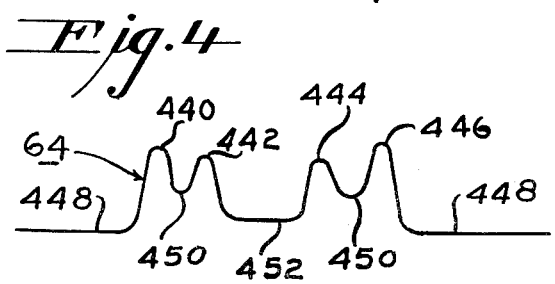
INVENTOR.
RAYMOND J. MOULY
BY
Clarence R. Patty, Jr.
ATTORNEY March 27, 1962 R. J. MOULY 3,027,457
NON-CONTACTING TUBING GAGE
Filed May 27, 1959 2 Sheets-Sheet 2
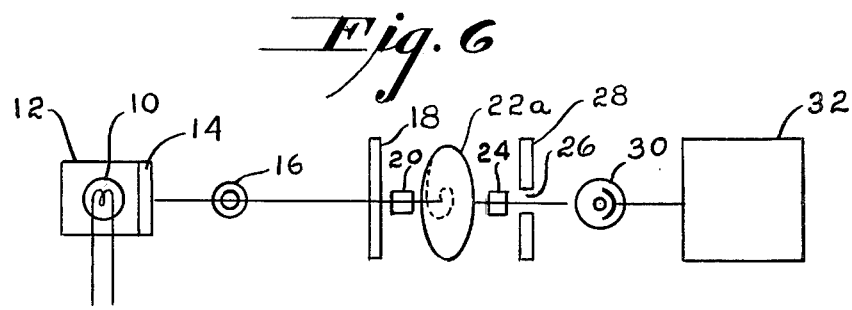
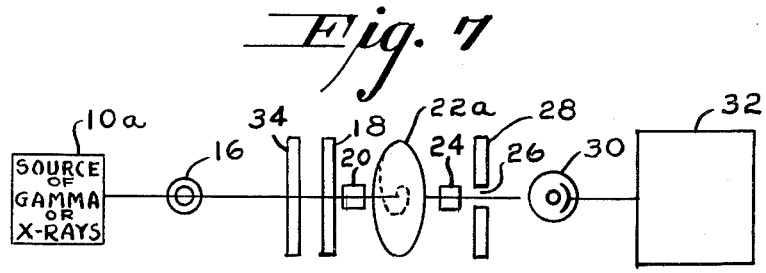
INVENTOR.
RAYMOND J. MOULY
BY
Clarence R. Patty, Jr.
ATTORNEY

United States Patent Office 3,027,457
Patented Mar. 27, 1962

3,027,457
NON-CONTACTING TUBING GAGE
Raymond J. Mouly, Corning, N.Y., assignor to Corning Glass Works, Corning, N.Y., a corporation of New York
Filed May 27, 1959, Ser. No. 816,284
19 Claims. (Cl. 250—83.3)

This invention relates to the gaging of transparent tubing and more particularly to an instrument for continuously gaging the outside diameter, the inside diameter and wall thickness of glass or other transparent tubing while it is being drawn.

The art of drawing tubing is well-known and may be accomplished by any of many well-known methods. Glass tubing, for example, may be drawn either horizontally or vertically up or vertically down and it will be obvious to those skilled in the art that my invention will find utility in any of the known methods of drawing tubing.

The prior art methods of manually gaging the drawn tubing is obviously not entirely satisfactory for high-speed production. It is recognized by those skilled in the transparent tube drawing art, that to manually gage each piece of tubing slows up the manufacturing operation thereby increasing the cost. In any event, to manually gage each piece of tubing the operator must wait until a given section of tubing is cooled sufficiently to handle and he must then break the section into increments that are small enough to get into the gaging machine.

Other prior art "automatic" gaging machines involve the use of compressed air and the passage of the tubing through a known orifice. This type of gage is exemplified in the pending application of Robert J. Settzo, Serial No. 520,299, and assigned to the assignee of the subject application. The drawback of the compressed air-orifice type of gage, is that only the outside diameter (O.D.) can be gaged and this with a limited degree of accuracy. The inside diameter (I.D.) and wall thickness must be gaged manually. Additionally, this type of system also suffers from not being able to accurately detect tubing that is "out-of-round."

The subject invention overcomes the inherent disadvantages of the prior art systems by simultaneously electronically gaging the inner diameter, the outer diameter, and the wall thickness of glass or other transparent tubing while it is "on the draw" or being drawn. With my system of gaging, the tubing is illuminated or irradiated with a source of diffused light to form an image that continuously emphasizes the inner and outer diameter as well as the wall thickness. The image is then photo-electrically scanned across the tubing diameter, and the signal obtained from the scanning process is used to supply all the necessary information from which either the inside or outside diameter or wall thickness may be determined.

It is, therefore, one object of my invention to provide an instrument that will continuously and simultaneously gage the outside diameter, the inside diameter, and the wall thickness of transparent tubing on the draw.

Another object of my invention is to provide a gaging system that is non-contacting.

A still other object of my invention is to provide a gaging system that is precise yet has an instantaneous response to the portion of the tubing being gaged.

Still another object of my invention is to provide an electro-optical system that is capable of continuously monitoring a tubing drawing process.

A further object of my invention is to provide a non-contacting electro-optical system that is capable of continuously monitoring a tubing drawing process.

A still further object of my invention is to provide an electro-optical system of tubing gaging capable of continuously and simultaneously providing information concerning the outside diameter, the inside diameter, and wall thickness of tubing on the draw.

Other objects, features, and many advantages will become apparent to those skilled in the art as my invention becomes better understood, by reference to the following detailed description, when considered in connection with the accompanying drawings, which drawings form a part of this application and wherein;

FIG. 1 is a schematic and block representation of one embodiment of my invention;

FIGS. 2 and 3 represent the paths of incident light rays through the tubing being gaged;

FIG. 4 represents the wave shape of the output of my photomultiplier cell and

FIG. 5 represents the waveshape of the output of either an infra-red sensitive detector or a gamma or X-ray detector.

FIG. 6 represents another embodiment utilizing a Nipkow disc as the scanning means, and FIG. 7 represents still another embodiment utilizing the combination of another source of irradiating energy and a Nipkow disc-type scanning means.

Referring now to FIG. 1, the preferred embodiment of my invention, there is shown a light source 10 enclosed in a container 12. The source of illumination is preferably enclosed in order to prevent stray light from interfering with any of the useful light. The source of illumination is preferably one that readily lends itself to being diffused. To insure diffusion, an opal diffusing glass 14 is interposed between light 10 and tubing 16. Diffusing glass 14, while shown here as being an opal glass, may be any other medium capable of uniformly diffusing light. The image that is formed when tubing 16 is irradiated with diffused light is then passed through polarizing filter 18, to improve the contrast of the image thereby improving the definition of any electrical signals generated by the image. The formed and now polarized image is then collected by telephoto lens 20 and presented to rotating prism 22 which scans the image in a plane perpendicular to the axis of tubing 16. The scanned segment of the tubing is then projected through lens 24 and aperture 26 of plate 28 and on to the cathode of the photomultiplier cell 30. Cell 30 functions in the usual manner to generate electrical signals therein that are a measure of the light flux passing through the aperture and falling on the cathode. Any of the well known utilization circuits herein designated as "pulse shaper" 32 may now be connected to the output of photomultiplier 30 to allow the generated electrical signals to be put to use. As for example, an oscilloscope may be used to display the generated signal.

Referring now to FIGS. 2 and 3, tubing 16 is presented in cross section, perpendicular to its axis. In both figures, 161 represents the outer surface of tubing 16 and 165 represents the material forming the wall of the tubing. 163 represents the inner surface of the tubing and 167 represents the bore defined by the inner surface 163.

In FIG. 2, tubing 16 is shown as irradiated with diffused light. Under these circumstances, rays refracted in a given direction fall into two general categories:

(1) Rays whose refracted path goes through the glass wall only, such as "a," a ray that has not been reflected from the inside glass/air interface, or "b," a ray that has been totally reflected on the inside glass/air interface. The latter rays striking the internal face of the wall at an incident angle larger than the critical angle.

(2) A ray such as "c" whose path goes through both glass walls and the inside bore of the tubing.

Considering now FIG. 3, and the paths of the rays L–1 and L–2 which are totally reflected on the internal face of the wall, we may write the following equations:

(1) $$R \sin \beta = r \sin \varphi$$
$$\sin \beta = \frac{r}{R} \sin \varphi$$

(2) $$\sin \alpha = n \frac{r}{R} \sin \varphi$$

(3) $$X = Rn \sin \beta = rn \sin \varphi$$

where:
$R = OA$
$r = OB$
$n =$ index of refraction if $\varphi = \varphi_c$ (critical angle) then, (4) $$\sin \varphi = \sin \varphi_c = \frac{1}{n}$$

and $X = r$ and is independent of $n$ and $R$.

Thus, with diffused lighting irradiating a section of the tubing, the transition of rays that do not pass through the tubing to rays that are passed through the glass wall only, when viewed parallel to the axis of the tubing, will be represented by dark lines indicating the outside diameter. This transition occurs at the rays $d_1$ and $d_2$ in FIG. 2. The transition of those rays that wholly pass through the glass wall or are totally reflected on the glass/air interface to those rays that pass through both walls and inside bore of the tubing likewise, when viewed parallel to the axis of the tubing, are represented by a pair of dark lines that indicate the inside diameter. This latter transition occurs at the ray $L_1$ and $L_2$ whose angle of incidence on the internal face of the wall is equal to the critical angle $\varphi$ in FIG. 3.

Therefore, the parallax-free observation, with the observer at infinity, of concentric glass or other transparent tubing, illuminated by a source of diffused light, shows the internal and external dimensions of the tubing with good definition. This is the projected image scanned by prism 22 wherein the two outer dark lines represent the outside diameter and the two inner dark lines represent the inside diameter or inner surface of the tubing. The two areas between each outside diameter dark line and each adjacent inside dark line represents the wall thickness.

Since the transition from one type of ray to another manifests itself as a dark line, curve 64, FIG. 4, represents the output of the phototube as it would appear if presented on the cathode ray tube of an oscilloscope. If the scanning speed of prism 22 is maintained constant, the interval between the four peaks 440, 442, 444, and 446, would correspond identically with the distance between the four dark lines representative of the inside and outside diameters of the tubing.

Portions 448 of curve 64 represent scanned light rays that do not pass through the tubing such as light rays to the left of $d_1$ and the right of $d_2$, FIG. 2. Valleys 450 represent light rays passing solely through the glass wall of the tubing such as rays $a$ and $b$ of FIG. 2 while valley 452 represents light rays that have passed through two wall thicknesses plus the intervening bore as represented by "$c$," FIG. 2.

Wave shape 64, FIG. 4, may now be passed through a series of differentiators and clipper-amplifiers (pulse shaper 32 of FIG. 1) and by means of adjustable coincidence gate circuits, as is well known in the art, it is possible to separate this pulse pattern into individual pulses corresponding to the tubing dimensions.

The measuring system proper (pulse shaper 32, FIG. 1) measures the ratio of the time interval between pulses to the scanning period and may be displayed in a form suitable for the particular application under consideration such as gaging, control, or logging, etc.

Although my system has been described in terms of a rotating prism, and a source of diffused light, it will be obvious to those skilled in the art that it is not necessarily restricted to these methods of operation. Instead of the rotating prism, a Nipkow disc may be substituted for the prism in the lens system. This would obviate the need for an optical system yet, when combined with photocell 30, FIG. 1, would produce a wave shape similar to the wave 64 of FIG. 4. To illustrate, reference is made to FIG. 6 wherein a Nipkow scanning disc 22a is substituted for prism 22. In all other respects, FIG. 6 is identical to FIG. 1.

Since this invention has particular utility in a tube drawing operation, the most obvious place to detect flaws and/or deviations from normal is at a station immediately following the drawing operation. Under these circumstances, the tubing is still quite hot and radiates high levels of energy in the infra-red portion of the spectrum. An infra-red detector may now be substituted for photocell 30 of FIG. 1, and the radiated infra-red energy used as a source of radiation instead of diffused lighting.

The amount of energy radiated from any given section of a hot body is strongly dependent on the thickness of the body material at that section. An appropriate infra-red filter may now be substituted for filter 18, FIG. 1, to select only that portion of the radiant energy emitted by the hot tubing that is strongly thickness dependent. An image would then be formed that is scanned in a manner similar to that described in connection with FIG. 1. The scanned image is then presented to an infra-red sensitive detector such as a lead sulfide type, and the signal thus obtained may be utilized in any of many well known circuits to be displayed.

The signal obtained at the output of the detector is similar to waveshape 564 of FIG. 5. The important factor in this curve being that the sudden changes in the slopes occurring at 540, 546, and 542, 544 correspond identically with the outside and inside diameters respectively, of the tubing being examined. The portion 552 of the curve represents the cross-section of tubing that includes the bore.

Another embodiment, which will become obvious to those skilled in the art after having read the foregoing specification, manifests itself in the form of substituting very short wave energy for the infra-red energy source previously discussed. This very short wave radiation may take the form of either gamma or X-rays which lie in the region of the spectrum beyond ultra violet. In the case of a very short wave radiant energy source, the output waveshape of the photomultiplier will be very similar to FIG. 5, the output wave shape obtained in the embodiment utilizing infra-red as a source of energy radiation. This particular phenomenon holds true for gamma and X-rays as well as infra-red because, like infra-red, the amount of gamma or X-rays passing through the tubing is dependent on and sensitive to the thickness of the section of tubing through which it passes.

In this last embodiment it will be necessary to interpose between the tubing being observed and any lens system (element 20, FIG. 1), a fluorescent screen upon which the image may be produced. Otherwise, the manifestation of the image and the method with which the image is subsequently utilized is identical in all respects to the prior recited embodiments.

To illustrate, reference is made to FIG. 7 wherein the source of gamma or X-rays 10a is substituted for the source of visible radiation of FIGS. 1 and 6. In this embodiment an image of tubing 16 is formed on fluorescent screen 34 in a well-known manner. The scanning means, which in this instance is indicated as a Nipkow scanning disc 22a, scans the image produced on screen 34. The scanned image is then projected through aperture 26 of plate 28 and onto the cathode of the photomultiplier cell 30 to which pulse shaper 32 or any other utilization circuit is connected. While the scanning means is indicated in this last embodiment as a Nipkow scanning disc, it should be obvious to anyone skilled in the art that the prism 22 of FIGS. 1 and 6 may be substituted for disc 22a. The use of polarizing filter 18 in this embodiment is optional and performs the function of improving the contrast of the image, if so desired.

Still another important embodiment which will become obvious to those skilled in the art after reading this specification, is one where the "pull" or rate at which the material is being drawn from a tank may be readily determined. Since the wall thickness may be determined by any of the methods previously described and since the density of the material is known, it now remains only to supply the velocity information to an integrating device along with the mass and density information to derive the pull. Properly integrated, the output of the integrator is the pull on the tank and is a figure expressed in weight per unit time.

While I have described what is presently considered the preferred embodiment of my invention as well as some obvious variations therein, it will be apparent to those skilled in the art that various other modifications and alterations may be made therein without departing from the inventive concept contained herein and it is aimed in the appended claims to cover all such modifications and alterations as fall within the true spirit and scope of my invention.

What is claimed is:

1. A gaging system comprising: continuously drawn transparent tubing in accordance with the inside and outside diameters and wall thickness thereof, means forming an image of said tubing, means scanning said image in a plane perpendicular to the drawn axis of said tubing and means detecting selected portions of said scanned image corresponding to said inside and outside diameters and wall thickness of said tubing.

2. The device of claim 1 wherein said means forming an image of said tubing comprises energy in the visible portion of said spectrum.

3. The device of claim 1 wherein said means forming an image of said tubing comprises very short wave energy in the region beyond the ultra violet portion of the spectrum.

4. The device of claim 1 wherein said means forming an image of said tubing comprises energy in the infra-red portion of the spectrum and is derived from said tubing.

5. A gaging system comprising: continuously drawn transparent tubing, a source of radiant energy irradiating said tubing and forming an image in accordance with the inside and outside diameters and wall thickness thereof, means radially scanning a portion of said image corresponding to the diameter of said tubing, and means selectively detecting portions of said scanned image corresponding to the inside diameter and outside diameter and wall thickness of said tubing.

6. The device of claim 5 wherein said source of radiant energy comprises a source of diffused light.

7. The device of claim 5 wherein said source of radiant energy comprises very short wave radiations in the region beyond the ultra violet portion of the spectrum.

8. A gaging system comprising: continuously drawn transparent tubing, means irradiating said tubing with energy, said energy refracted through said tubing to form an image thereof in accordance with the inside and outside diameters and wall thickness of said tubing, means radially scanning a portion of said image corresponding to a cross section of said tubing and means selectively detecting said inside and outside diameters and said wall thickness.

9. The device of claim 8 wherein said irradiating energy comprises energy in the visible portion of the spectrum.

10. The device of claim 9 further including a light source irradiating said tubing with diffused light.

11. The device of claim 10 wherein said scanning means comprises a rotating prism.

12. The device of claim 10 wherein said scanning means comprises a Nipkow disc.

13. The device of claim 8 wherein said irradiating energy comprises very short wave radiations beyond the ultra violet portion of the spectrum.

14. The device of claim 13 further including a fluorescent screen on which said tubing image is formed.

15. The device of claim 14 wherein said scanning means comprises a rotating prism.

16. The device of claim 14 wherein said scanning means comprises a Nipkow disc.

17. A gaging system comprising: continuously drawn hot tubing, said tubing radiating energy in the infra-red portion of the spectrum and forming an image thereof in accordance with the inside and outside diameters and wall thickness of said tubing, means radially scanning a portion of said image corresponding to a cross section of said tubing and means selectively detecting said inside and outside diameters and said wall thickness.

18. The device of claim 17 wherein said scanning means comprises a rotating prism.

19. The device of claim 17 wherein said scanning means comprises a Nipkow disc.

References Cited in the file of this patent

UNITED STATES PATENTS

| | | |
|---|---|---|
| 2,349,429 | Herzog | May 23, 1944 |
| 2,393,631 | Harrison et al. | Jan. 29, 1946 |
| 2,532,644 | Robinson | Dec. 5, 1950 |
| 2,606,294 | Hagan | Aug. 5, 1952 |
| 2,904,700 | Rockey | Sept. 15, 1959 |